No. 752,957. PATENTED FEB. 23, 1904.
J. A. COLAS.
MAP.
APPLICATION FILED FEB. 24, 1902.
NO MODEL. 2 SHEETS—SHEET 1.
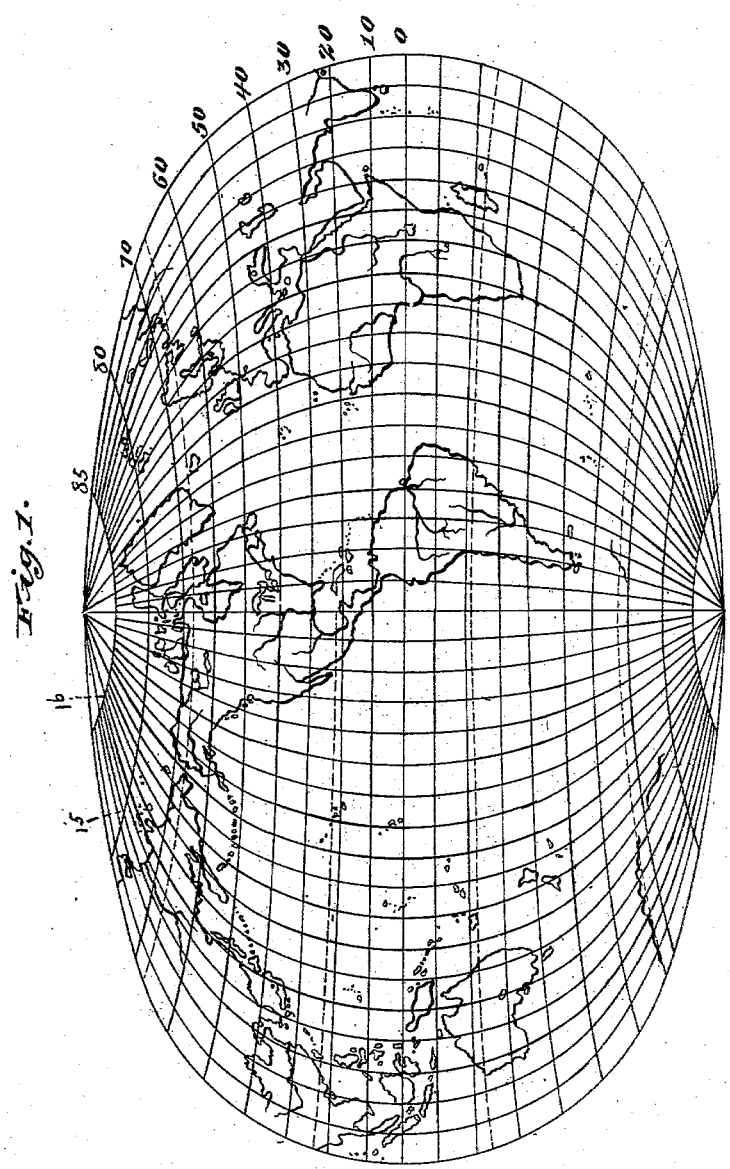

No. 752,957. PATENTED FEB. 23, 1904.
J. A. COLAS.
MAP.
APPLICATION FILED FEB. 24, 1902.
NO MODEL. 2 SHEETS—SHEET 2.
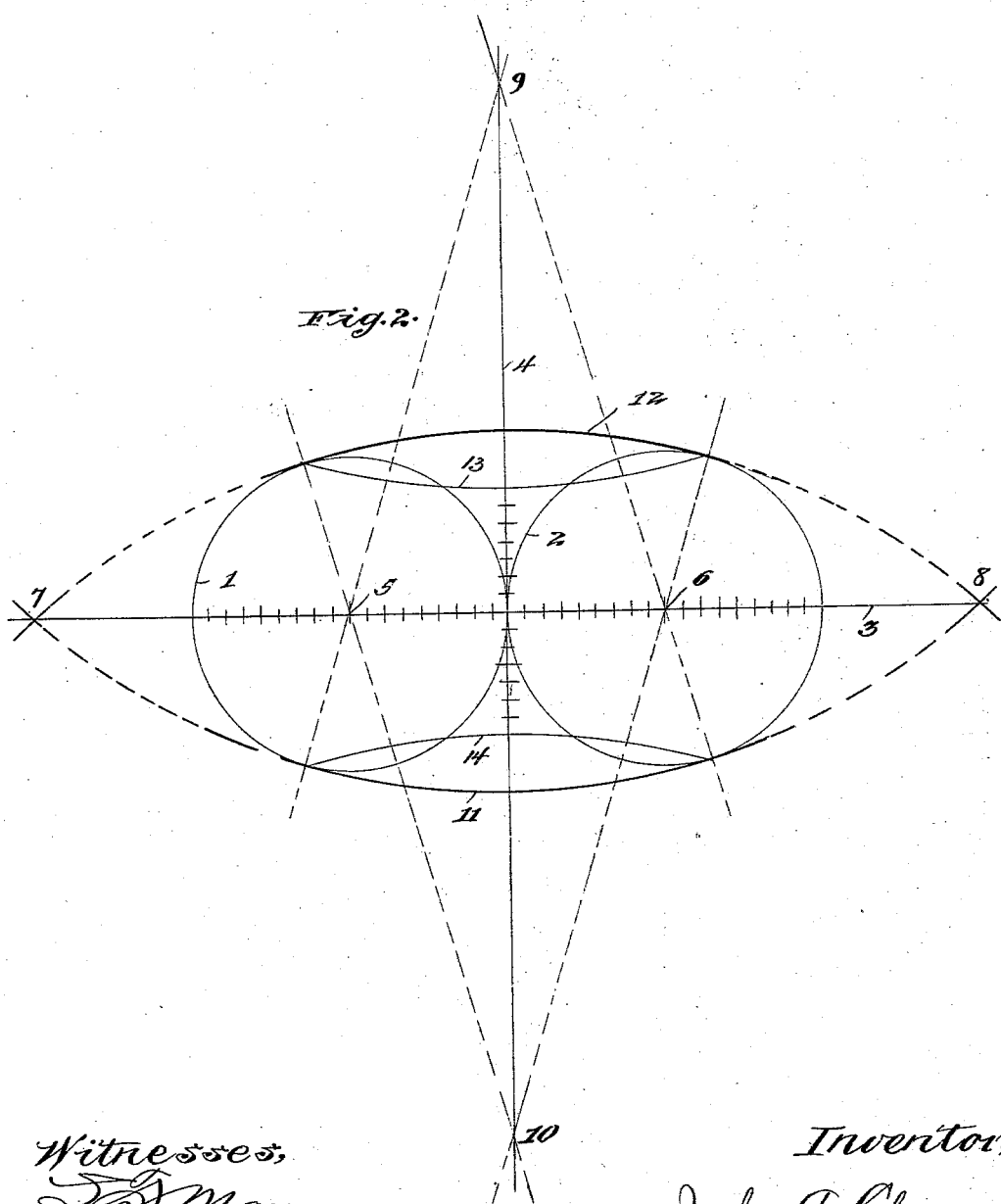

No. 752,957.

Patented February 23, 1904.

UNITED STATES PATENT OFFICE.

JULES A. COLAS, OF CHICAGO, ILLINOIS, ASSIGNOR TO POOLE BROTHERS, OF CHICAGO, ILLINOIS, A CORPORATION OF ILLINOIS.

MAP.

SPECIFICATION forming part of Letters Patent No. 752,957, dated February 23, 1904.

Application filed February 24, 1902. Serial No. 95,355. (No model.)

*To all whom it may concern:*

Be it known that I, JULES A. COLAS, of 116 Harrison street, Chicago, Illinois, have invented certain new and useful Improvements in Maps, of which the following is a specification.

This invention relates to improvements in maps, and refers more specifically to a map designed to show the geographical features of the entire earth with approximate correctness.

Various forms of maps have heretofore been designed for presenting to the eye a comprehensive view of the principal geographical features of the earth—such as those commonly known as "Mercator's" maps, maps in which the two hemispheres are represented in the form of true circles, maps in which the two hemispheres have been represented upon such a figure as would be formed by partially overlapping two contiguous hemispheres, and maps in which the entire earth has been represented upon a single circular figure or hemisphere. All of these different forms have necessarily produced very considerable distortion of certain parts of the earth's surface and because of this distortion have failed to present to the eye such an appearance as would correctly convey to the mind a true conception of the relation of geographical features to each other.

It is the object of the present invention to provide a form of map the structural lines of which may be generated with comparative ease and simplicity and which will present to the eye and convey to the mind the nearest approximation to correctness possible in representing upon a flat surface the geographical features of the globe.

To this end the invention consists in the matters hereinafter described, and more particularly pointed out in the appended claims, and the same will be more readily understood from the following description by reference to the accompanying drawings, forming a part thereof, in which—

Figure 1 is a representation of a map embodying my invention and in which that meridian chosen for the vertical one of the map is that which is ninety degrees west of Greenwich and passes through the city of New Orleans. Fig. 2 is a diagrammatic view showing the method of generating the structural lines of the map.

Before proceeding to describe the map in detail it may be stated that no absolute or fixed rule of construction is adopted in laying out the map as a whole; but, on the contrary, a form of figure is adopted which is designed to produce the least possible distortion of the principal countries and inhabited portions of the globe consistent with the object in view—viz., the production of a map of the complete world—while as to those portions of the map representing the polar regions a more or less arbitrary representation is adopted, which presents to the eye a more correct impression of the true relations of the geographical features than would be presented were the same plan of structure followed which is followed in producing the main body of the map. In this same connection it may be noted that while I have herein described a method of generating or reproducing an exact and definite outline, yet, as will appear from the description of the map, this exact geometrical figure is not essential; but it may be somewhat modified within discretion without departing from the invention.

Referring to Fig. 2, in generating the outline of the map I first describe two circles of equal diameter side by side, with their proximate sides meeting or substantially meeting, as indicated at 1 and 2. Through the centers of these circles I draw a right line 3, extending the same for convenience a distance equal to one-half the diameter of one of the circles beyond the outside of each circle. I also draw a second right line, as 4, perpendicular to the line 3 and intersecting the latter at a point centrally between the two centers 5 and 6 of the two circles. On the line 3 I lay out two points, as 7 and 8, respectively, distant from the nearest point of the proximate circle a distance equal to one-half the diameter of the circle. On the line 4 I next find two points 9 and 10, from which, employed as centers, arcs may be described, as 11 and 12, respectively, which will intersect the points 7 and 8 on the line 3 and touch the sides of the circles most remote from the points 9 or 10, being used as centers. The portions of the arcs 11 and 12 joining the two circles and those portions of the circles extending between the ends of the arcs 11 and 12 at the sides of the circles remote from each other form the outline of the map, as shown in Fig. 2. I next divide that part of the line 3 which forms the equator-line of the map into spaces representing equal numbers of degrees of the entire circumference or three hundred and sixty degrees, these spaces in the present instance representing ten degrees each and there being consequently thirty-six spaces. A set of meridians is provided extending from pole to pole and so disposed as to severally intersect the equator at the several ten-degree spaces, these meridians taking the form of smooth curves except as to the central meridian, which is a direct line between the poles. I next lay out north and south of the equator-line 3 on said central meridian 4 seven spaces, each equal to one of the ten-degree spaces, and at the ends of the seventh spaces I locate the seventy-degree parallels of latitude, (designated 13 and 14.) These parallels are so projected as to intersect the outline of the map at the ends of the arcs 11 and 12, respectively, or at points where lines extended from the centers 9 and 10 through the centers of the circles 5 and 6 would intersect the sides of such circles remote from the points 9 and 10, respectively. The north pole is located at the intersection of the vertical meridian with the upper outline of the map and the south pole at a corresponding point on the lower outline, and the parallels of latitude between the seventy-degree parallels and the poles are divided arbitrarily to suit the judgment of the designer, it being noted that the space between the seventy-degree parallels and the pole which is to be divided into twenty degrees is very considerably greater than two spaces or the space covered by twenty degrees between said seventy-degree parallels and the equator. In the present instance the spaces between the seventy-degree parallels and the poles are divided into three spaces by means of two parallels 15 and 16, representing the eighty-degree and eighty-five-degree parallels of latitude. The parallels of latitude between the seventy-degree parallels are so disposed as to intersect the meridian 4 at the several ten-degree spaces, each succeeding parallel north or south of the equator being drawn slightly more curved than the preceding one and being more or less arbitrarily spaced as they intersect the outline.

From the foregoing it will be seen that the approximately rectangular spaces formed by the intersecting sets of meridians and parallels may be and are employed as guides for plotting in the points and outlines of the geographical features, so that all given points are accurately located with reference to latitude and longitude. The amount of distortion which occurs is reduced to a minimum consistent with showing the entire globe on a plane of uninterrupted area. The foregoing applies, of course, only to so much of the map as lies between the north and south seventy-degree parallels; but inasmuch as practically the entire inhabited part of the globe falls between these parallels it is a matter of minor importance that the polar areas cannot be so accurately plotted by means of the parallels and meridians alone. As a matter of fact, the proportionately large amount of area afforded north and south of the seventy-degree parallels by the peculiar construction described enables the geographical features in these polar areas to be represented much more distinctly and in such manner as to convey much more correctly to the mind the true relation of things than could be done otherwise, so that the sacrifice of theoretical correctness is an advantage. The spacing apart of the parallels between the equator and the seventy-degree parallels is also to a certain degree arbitrary, so far as their end portions, which intersect the outline of the map, are concerned; but the equator-point and the ends of the seventy-degree-parallel points being known and it being also known that the surface dealt with is a spherical one, it follows that the spacing of the parallels at their points of intersection with the outline from the equator north and south will be gradually increased, or, in other words, each succeeding parallel north and south of the equator will be curved slightly more than the preceding one.

Of course it will be understood that the selection of the central meridian is purely arbitrary, and any given meridian may be selected as the central one and the map changed accordingly. The meridian chosen in the present instance, which passes through New Orleans, is selected as a desirable basis from which to represent the distances east and west for a map to be used throughout the United States and territories thereof. It will be understood, therefore, that I do not limit myself to the exact representation shown; but, on the contrary, the invention may be embodied in other forms without in any sense departing from the spirit thereof. It will also be equally obvious that the same method of construction may be employed in representing any other globe than the earth.

I claim as my invention—

1. A map of the earth having the outline of an oval and provided with an equatorial line dividing said oval longitudinally, a central meridian perpendicular to the equator, a series of other meridians intersecting the equator at regular and uniform intervals apart and curved to converge to the poles, a series of parallels which throughout the greater part of the distance north and south of the equator are spaced to intersect the central meridian at uniform intervals, the total length of the central meridian being substantially greater than one-half the length of the equator-line.

2. A map of the earth having the outline of an oval and provided with a straight equatorial line dividing said oval longitudinally, a central meridian perpendicular to the equator, a series of other meridians intersecting the equator at regular and uniform intervals apart and curved to converge to the poles, a series of parallels which throughout the greater part of the distance north and south of the equator are spaced to intersect the central meridian at intervals uniform with the spacing apart of the meridians at the equator, the total length of the central meridian being substantially greater than one-half the length of the equator-line.

3. A map of the earth having the form of an oval provided with a straight equatorial line dividing said oval longitudinally and equally, a central meridian perpendicular to the equator and of a length substantially greater than one-half the length of the equatorial line, a series of parallels north and south of the equator, a series of meridians east and west of the central meridian intersecting the equator at regular and uniform intervals apart and dividing the equator into three hundred and sixty degrees, said meridians being curved to converge to the poles and to intersect all of the parallels so as to divide each of the latter into an equal number of spaces of a uniform length, said parallels from the equator north and south to points approximately seventy degrees therefrom being spaced apart at uniform distances on the central meridian and distances equal to the spacing apart of the meridians at the equator substantially as described.

4. A map of the globe, having the outline of an oval, whose ends are arcs of equal circles, its equatorial line of a length equal to twice the diameter of said circles and arranged to equally divide said oval longitudinally, its longer sides formed by arcs of circles of a radius to intersect right-line continuations of the equator-line at points outside of and distant from the ends of the oval one-fourth the length of the equator and tangent to said circles, its meridians arranged to divide said equator into equal parts of three hundred and sixty degrees and its central one perpendicular to the equator, and its north and south seventy-degree parallels arranged to intersect said central meridians at points seven thirty-sixths ($\frac{7}{36}$) of the length of the equator-line respectively north and south of the latter and to intersect the outline of the oval at the points where the arcs thereof of different curvature merge.

5. A map of a globe consisting of a plane oval figure whose longer axis represents the equator and is intersected by a series of meridians spaced at uniform intervals apart and which spaces aggregate three hundred and sixty degrees, a meridian arranged perpendicularly to the equator and intersecting the latter centrally of its length, a series of parallels of latitude laid off upon said central meridian, the seventieth-degree parallels of which are located a distance from the equator equal to seven thirty-sixths ($\frac{7}{36}$) of the length of the latter, north and south poles located at points where the central meridian intersects the boundary of the map, said north and south poles being located at a distance from the equator approximately ten thirty-sixths of the length of the equator, for the purposes set forth.

JULES A. COLAS.

Witnesses:
WM. H. POOLE,
ALBERT H. GRAVES.